United States Patent [19]

Alioto

[11] Patent Number: 4,842,290

[45] Date of Patent: Jun. 27, 1989

[54] COMBINATION SEAT POST AND AIR PUMP FOR BICYCLE

[76] Inventor: Kevin J. Alioto, 40 Locksly La., San Rafael, Calif. 94901

[21] Appl. No.: 199,420

[22] Filed: May 27, 1988

[51] Int. Cl.⁴ .............................................. B65B 3/04
[52] U.S. Cl. .................................... 280/201; 152/415
[58] Field of Search ........................ 280/201; 152/415; 141/98; 417/313

[56] References Cited

U.S. PATENT DOCUMENTS

| | | | |
|---|---|---|---|
| 527,607 | 10/1894 | Jeffery | 280/201 |
| 657,645 | 9/1900 | Wolbrecht | 280/201 |
| 702,976 | 6/1902 | Lymburner | 280/201 |
| 730,074 | 6/1903 | Allen | 280/201 |
| 1,270,661 | 6/1918 | Reed | 280/201 |
| 4,712,592 | 12/1987 | Brown | 280/201 |

Primary Examiner—Charles A. Marmor
Assistant Examiner—Donn McGiehan
Attorney, Agent, or Firm—Townsend and Townsend

[57] ABSTRACT

An air pump for bicycles in which, when the air pump is not in use, is stored in the frame of the bicycle and serves as the post for the seat of the bicycle. The air pump has an outer, tubular post having structure on the upper end thereof for removably mounting a bicycle seat. The post is removably mounted in a bicycle frame. A tube extends partially into the post and carries a diaphragm on its inner end. The diaphragm is engageable with the inner surface of the post and compresses air in advance of the diaphragm when the diaphragm moves toward the upper end of the post. A check valve near the diaphragm permits only a one-way flow of air, namely in the direction through the tube and away from the upper end of the post. A lower member on the outer end of the tube allows a flexible hose to be coupled to the tube so that compressed air from the tube can be directed into the valve stem of a device to be inflated.

11 Claims, 2 Drawing Sheets

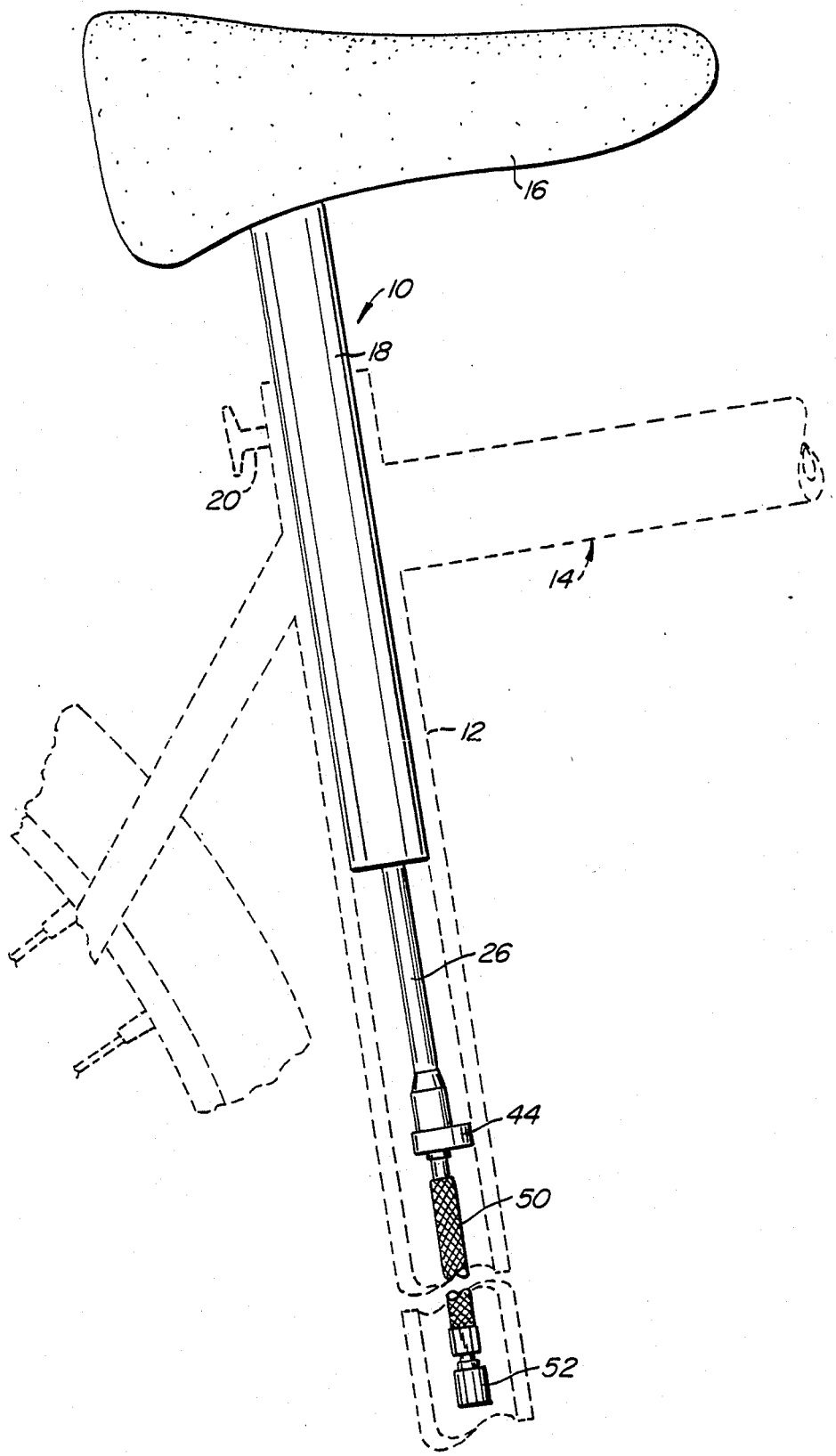
FIG._1.

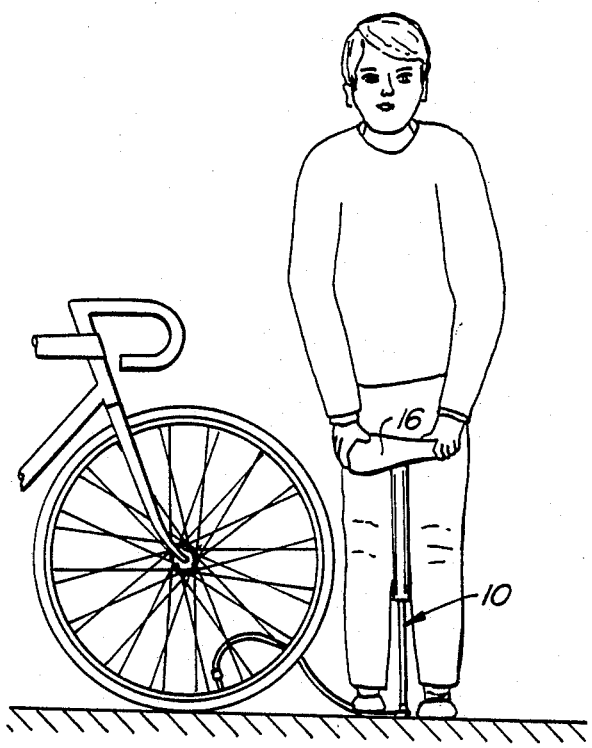
FIG._2A.
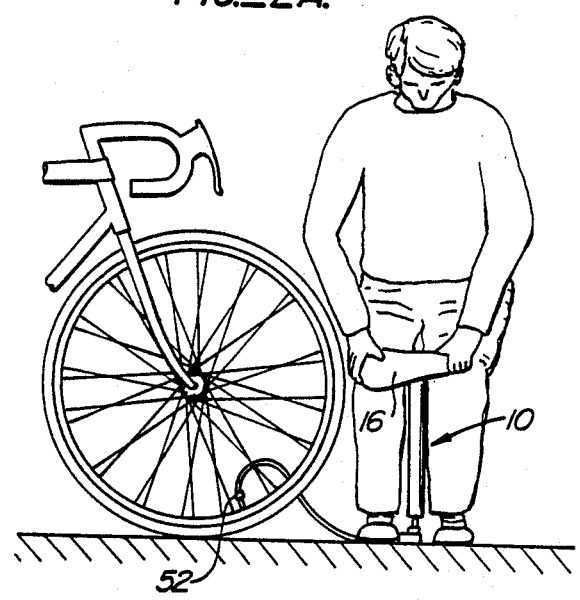
FIG._2B.
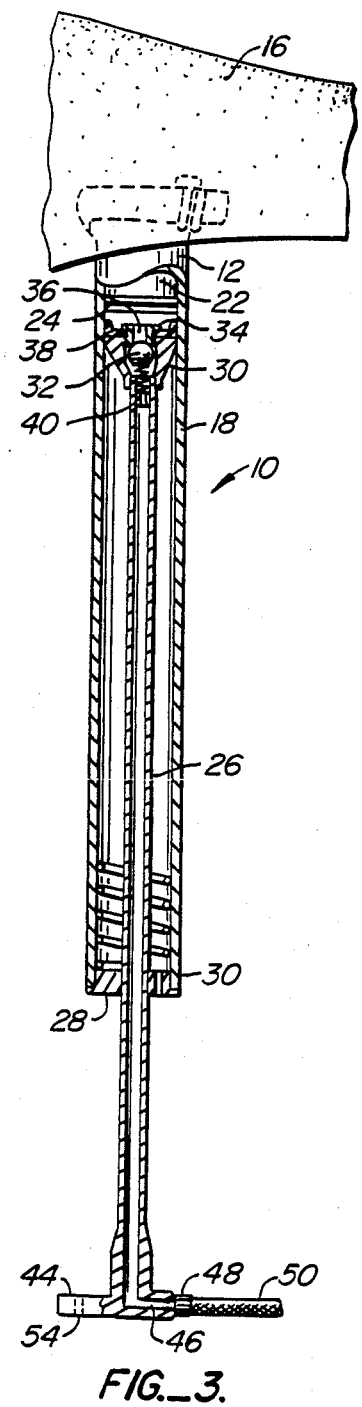
FIG._3.
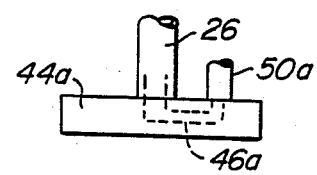
FIG._4.

COMBINATION SEAT POST AND AIR PUMP FOR BICYCLE

BACKGROUND OF THE INVENTION

1. Field of the Invention

This invention relates to improvements in bicycle component parts and, more particularly, to an air pump which can serve as the post for a bicycle seat.

2. Description of the Prior Art

Air pumps carried on bicycles have been known and used in the past. Disclosures of such a concept are found in U.S. Pat. Nos. 527,607, 657,845, 702,976 and 730,074. For the most part, these disclosures show an air pump built into the frame of a bicycle and, while the air pumps of these disclosures are useful in certain applications, they are cumbersome to use and are expensive to produce. For this reason, a need exists for improvements in air pumps carried on bicycles and the present invention satisfies this need.

SUMMARY OF THE INVENTION

The present invention is directed to an air pump for bicycles in which, when the air pump is not in use, is stored in the frame of the bicycle and serves as the post for the seat of the bicycle. To this end, the air pump of the present invention has an outer, tubular post having means on the upper end thereof for removably securing a bicycle seat to the post. The post is removably mounted in a bicycle frame in the normal fashion of a conventional seat post.

A tube extends partially into the post and carries a diaphragm on its inner end. The diaphragm is engageable with the inner surface of the post and compresses air in advance of the diaphragm when the diaphragm moves toward the upper end of the post. A check valve near the diaphragm permits only a one-way flow of air, namely in the direction through the tube and away from the upper end of the post.

A lower member on the outer end of the tube allows a flexible hose to be coupled to the tube so that compressed air from the tube can be directed into the valve stem of a bicycle tire to be inflated. In one embodiment of the pump, the lower member is removably coupled to the hose and the hose extends longitudinally of the tube and away therefrom to allow storage of the hose and tube together with the rest of the pump in the bicycle frame. In a second embodiment of the member, the hose extends parallel to and side-by-side with the lower end of the tube so that both the hose and tube can be placed in the tubular frame member of the bicycle.

The primary object of the present invention is to provide an improved air pump for a bicycle in which the air pump has a tubular post which serves to mount a bicycle seat on a bicycle frame yet the pump can be removed from the frame and used to inflate a tire of the bicycle while the seat remains attached to the post.

Other objects of this invention will become apparent as the following specification progresses, reference being had to the accompanying drawings for an illustration of this invention.

BRIEF DESCRIPTION OF THE DRAWINGS

FIG. 1 is a side elevational view of the air pump of the present invention, showing the way in which it is received in the frame of a bicycle and is connected to a seat, the air pump being shown in side elevation;

FIG. 2A is a side elevational view of the pump in use for pumping air into a bicycle tire, the air pump being in a condition just immediately before air is compressed by the pump;

FIG. 2B is a view similar to FIG. 2A but showing the air pump immediately after being forced downwardly to compress air and force the compressed air into the bicycle tire;

FIG. 3 is a view similar to FIG. 1 but showing the air pump in section; and

FIG. 4 is a second embodiment of a portion of the air pump, showing the way in which the air hose leading to the bicycle tire is coupled to one end of the pump.

DETAILED DESCRIPTION OF THE PREFERRED EMBODIMENTS

The air pump of the present invention is broadly denoted by the numeral 10 and is adapted to be fitted into a tubular part 12 of a bicycle frame 14, tubular part 12 having an open top and being the part normally receiving the seat post of a conventional bicycle. The air pump 10 of the present invention is designed to replace the conventional seat post yet it is further designed with means 15 to become attached at its upper end to the seat 16 of the bicycle, such connection between the air pump and the seat being any a suitable construction.

Air pump 10 further includes an outer cylinder or tubular post 18 which is adapted to be removably received in tubular part 12 of bicycle frame 14. To this end, the outer diameter of post 18 is generally about equal to or slightly less than the inside diameter of tubular part 12. Post 18 is secured in any suitable manner to tubular part 12, such as by a threaded bolt 20 (FIG. 1) which, when loosened, allows post 18 to be lifted out of tubular part 12 and to be used as part of air pump 10 in a manner hereinafter described.

A plug 22 having an O-ring 24 thereon is received in the normally upper end of post 18. Plug 22 is secured to post 18 in any suitable manner, such as by a pin. Thus, O-ring 24 seals the upper end of post 18.

A hollow tube 26 extends into post 18 and passes through the center hole of a disc-shaped bearing member or end piece 28 at the normally lower end 30 of post 18. The tube 26 has its upper, inner end threadably coupled to a conically-shaped member 30 which has a central recess for receiving a ball 32 held in place in the recess by a screw 34 having a central hole 36 therethrough. The screw 34 also holds a flexible diaphragm 38 in place, the diaphragm having a central, disc-like web and an annular side wall integral with the outer periphery of the web. The side wall of the diaphragm slidably engages the inner surface of post 18 as tube 26 is shifted up and down in the post. A coil spring 40 in the upper end of tube 26 biases ball 32 against the lower open end of screw 34; thus, the ball acts as a check valve which allows the air flow downwardly through the tube in one direction but prevents the flow of air through the tube in the opposite direction. A coil spring 42 surrounds tube 26 and prevents conical member 30 from bottoming out and striking end piece 28 when the pump is in use.

The lower end of tube 26 has a disc-like member 44 which is provided with a lateral passage 46 therein communicating with the central passage of tube 26. A fitting 48 on a flexible hose 50 is threadably coupled to member 44 in fluid communication with passage 46 thereof. Hose 50 has another fitting 52 at the opposite end thereof for attachment to the valve stem of a bicycle tire to be inflated as shown in FIGS. 2A and 2B.

Member 44 has a threaded hole 54 for threadably receiving fitting 48 of hose 50 so that the hose 50 can extend vertically in the manner shown in FIG. 1 relative to tube 26. Thus, hose 50 can be removably coupled at one or the other of the two locations on member 44, depending upon whether the pump 10 is to be stored as shown in FIG. 1 or used as shown in FIGS. 2A and 2B.

Another form of a member similar to member 44 is shown in FIG. 4 and denoted by the numeral 44a. In this embodiment, member 44a is coupled to the lower end of tube 26 and hose 50a is permanently coupled to member 44a and is coupled to the interior of tube 26 by a fluid passage 46a. In the embodiment of FIG. 4, hose 50a need not be removed from connection with member 44a because the hose 50a extends longitudinally of and generally parallel with tube 26 when the pump is in the frame 12 as shown in FIG. 1.

In use, pump 10 forms a seat post for seat 16. Post 18 will be in frame part 12 of bicycle frame 14 in the manner shown in FIG. 1. In this position, tube 26 and hose 50 will extend longitudinally of frame part 12 of frame 14 and bolt 20 will bear against the outer surface of post 18 to hold the post in a preselected position relative to the bicycle frame.

When it is desired to use air pump 10, bolt 20 is loosened and post 18 is removed from frame member 12. Hose 50 is then connected such that fitting 48 is threadably coupled to member 44 as shown in FIG. 3. Then the opposite fitting 52 of the hose 50 is fitted onto the valve stem of bicycle tire to be inflated The user then steps on member 44 and holds onto seat 16 (FIGS. 2A and 2B) while raising and lowering the seat. This action causes post 18 to move up and down relative to tube 26 which will remain stationary because of its connection to member 44.

As seat 16 is elevated, air will flow into chamber above the diaphragm 24 because the air will leak into post 18 through the center hole of bearing member 28 and past the outer periphery of diaphragm 24. At the top of the stroke of pump 10 (FIG. 2A) the direction is reversed and the seat 16 is forced downwardly, causing the air in the chamber above the diaphragm to be compressed and, as it is compressed, it forces check valve 32 to open causing compressed air to flow into and through tube 26 and out of the tube through hose 50 into the tire to be inflated. A continuous pumping action eventually directs enough air under pressure into the tire so that it is properly inflated. At the end of the pumping action, the fitting 52 is removed from the valve stem of the tire, hose 50 is threadably coupled to hole 54 (FIG. 3) and the assembly of pump 10 and hose 50 is replaced into frame member 12 of bicycle 14 as shown in FIG. 1. The pump will remain in this position serving as the seat post for seat 16 until the need for the pump arises once again.

I claim:

1. An air pump for a bicycle having a tubular frame part for normally receiving a seat part comprising:
    a hollow post removably receivable in the frame part of the bicycle;
    means mounted on the upper end of the post for coupling a bicycle seat thereto;
    a tube partially extending into the post through the lower end thereof;
    a diaphragm secured to the inner end of the tube and in sliding engagement with the inner surface of the post;
    a check valve adjacent to the diaphragm for providing a one-way flow of air through the tube; and
    a hose mounted on the opposite end of the tube for connecting the tube to a device to be inflated.

2. An air pump as set forth in claim 1, wherein is included a plug secured to the post for closing the upper end of the post, said plug and said diaphragm forming a chamber for air to be compressed when the diaphragm is moved under the influence of the tube toward the plug.

3. A bicycle pump as set forth in claim 2, wherein is included an 0-ring seal on the plug and in engagement with the inner surface of the post.

4. An air pump as set forth in claim 1, wherein the inner end of the tube has a rigid member coupled thereto, said member having an open end and an interior recess provided with a ball defining said check valve, and a spring biasing the ball into closing relationship to the open end of the rigid member.

5. An air pump as set forth in claim 4, wherein is included a threaded screw having a central air passage therethrough, the screw being threadably coupled to said rigid member and provided with a flange for holding the diaphragm to the rigid member.

6. An air pump as set forth in claim 5, wherein said ball is biased against the inner end of the screw in closing relationship to the air passage therethrough.

7. Apparatus as set forth in claim 1, wherein said post has a bearing member at the opposite end thereof, said tube being slidably received in a central hole of the bearing member.

8. An air pump as set forth in claim 1, wherein the tube has a projecting member on the outer end thereof, said projecting member having said hose thereon.

9. An air pump as set forth in claim 8, wherein said projecting member has a lateral air passage, said hose having a first fitting threadably coupled to the outer end of the air passage of the member.

10. An air pump as set forth in claim 9, wherein said member has a second threaded hole therethrough for threadably receiving the fitting on the hose to permit the hose to extend longitudinally of the tube and thereby allow the post and tube to extend into the tubular frame part of the bicycle.

11. An air pump as set forth in claim 8, wherein said hose is secured to said member and extends generally parallel with the tube when the post and tube are in the frame part of the bicycle.

* * * * *